May 22, 1956 C. H. FRASER 2,747,091

STABILIZATION OF RADIO FREQUENCY OSCILLATORS

Filed Nov. 21, 1951 2 Sheets-Sheet 1

INVENTOR

CYRUS H. FRASER

BY George Lipkin

ATTORNEY

May 22, 1956 C. H. FRASER 2,747,091

STABILIZATION OF RADIO FREQUENCY OSCILLATORS

Filed Nov. 21, 1951 2 Sheets-Sheet 2

INVENTOR

CYRUS H. FRASER

BY George Lipkin

ATTORNEY

United States Patent Office 2,747,091

Patented May 22, 1956

2,747,091

STABILIZATION OF RADIO FREQUENCY OSCILLATORS

Cyrus H. Fraser, La Mesa, Calif.

Application November 21, 1951, Serial No. 257,629

3 Claims. (Cl. 250—36)

Figure 1:
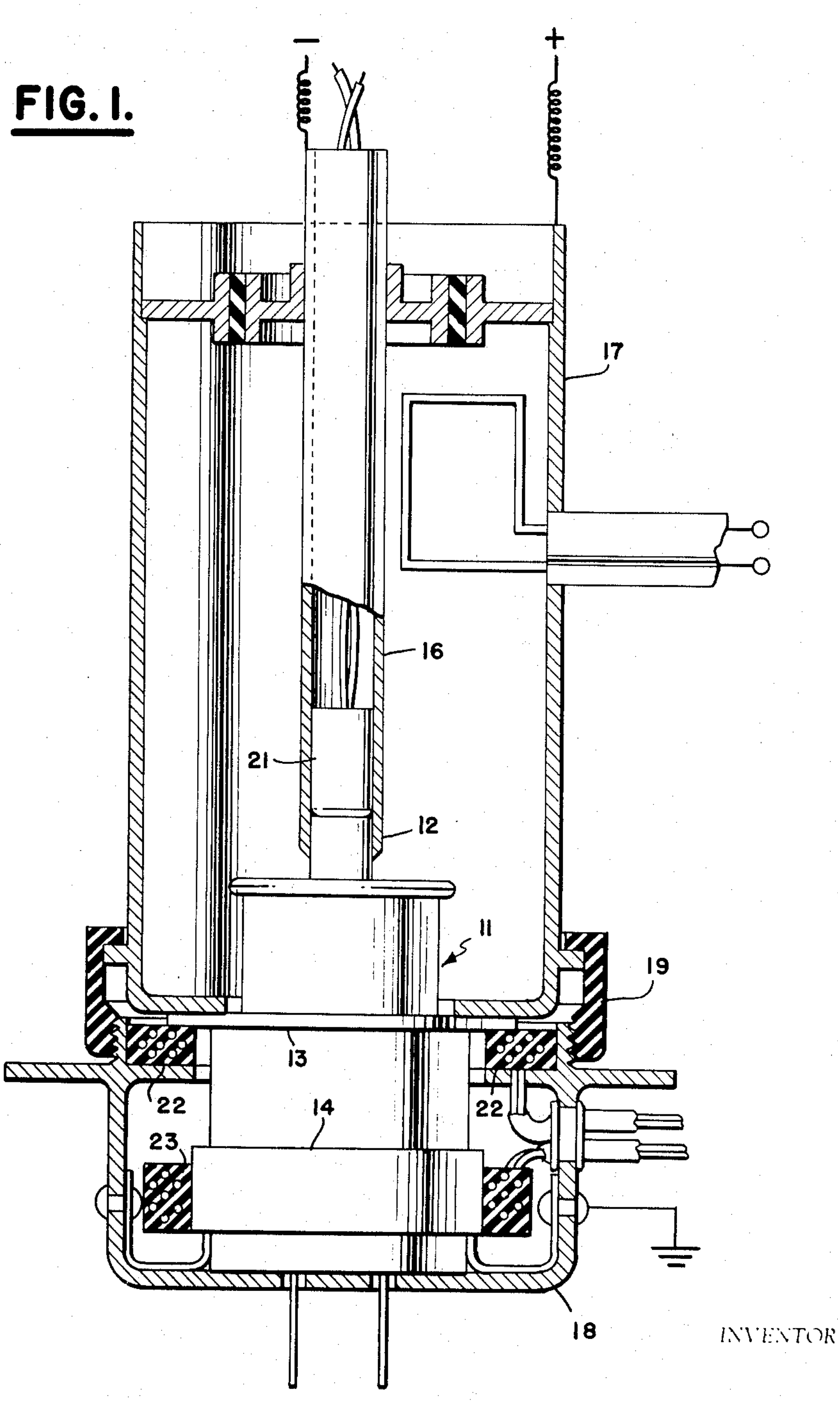

(Granted under Title 35, U. S. Code (1952), sec. 266)

The present invention relates to a stabilization system for high frequency oscillators and more particularly to a system for eliminating temperature variations therefrom.

Modern high frequency systems employ wave guides and cavity resonators made of highly conductive materials closely associated with vacuum tubes and in many cases integral therewith. High frequency vacuum tubes are normally operated at high current densities and the elements of these tubes are heated to high temperatures by the currents, the heating of each element being different from that of the remaining elements of the tube. Therefore, the system normally operates with the several waveguide components at different normal temperatures, and since many high frequency systems are operated on an intermittent duty cycle with periods of operation and idle periods of wide variation, the operating temperatures of the components will change with the duty cycle. Expansion and contraction of the circuit elements of a high frequency system cause large frequency changes in the output signal which make communication difficult in many cases. The size and spacing of tube elements in vacuum tubes operating at high frequencies affect the operating frequency of the circuit to an extent not encountered at lower frequencies, and temperature changes of the elements are therefore highly undesirable because the interelectrode capacities of the tube are large as compared with the capacitance of the resonant circuit.

It is common practice in modern high frequency tubes to provide conductive paths of large area through the envelope of the tube to provide cooling area and to reduce the interelectrode capacities of the tube by the improved tube construction thus afforded. These conductive paths transmit a large quantity of heat to the remainder of the circuit which cause dimensioned changes in the components and therefore frequency variations. In many cases the heated elements are themselves the envelope of the tube as in the case of the reflex klystron and the magnetron. The conducting paths through the tube envelope are usually quite substantial and will also transmit heat from an external source to the interior of the tube, in some cases.

Temperature control of the high frequency system as a whole does not compensate for temperature effects in the equipment because the equipment does not operate at a homogeneous temperature, so that the heating effects during operation are vastly different from those during idle periods. Frequency control systems which have been devised in the past have employed complex frequency measuring circuits and compensating arrangements for cavity resonators, and which while effective, are costly.

The present invention provides effective frequency stabilization of a high frequency oscillator operating on intermittent duty by employing a plurality of heating elements for the circuit components which are energized during the time the tube is not operating so that the components of the circuit and the tube electrodes are maintained at a substantially constant operating temperature.

It is an object of the present invention to provide a simple frequency stabilization system for a high frequency oscillator system.

It is a further object of the present invention to provide a temperature control system for a high frequency system which maintains the circuit components of the system at substantially a constant operating temperature.

It is a still further object of the present invention to provide a temperature control system for a high frequency oscillator which individually heats the components during idle periods.

Figure 2:
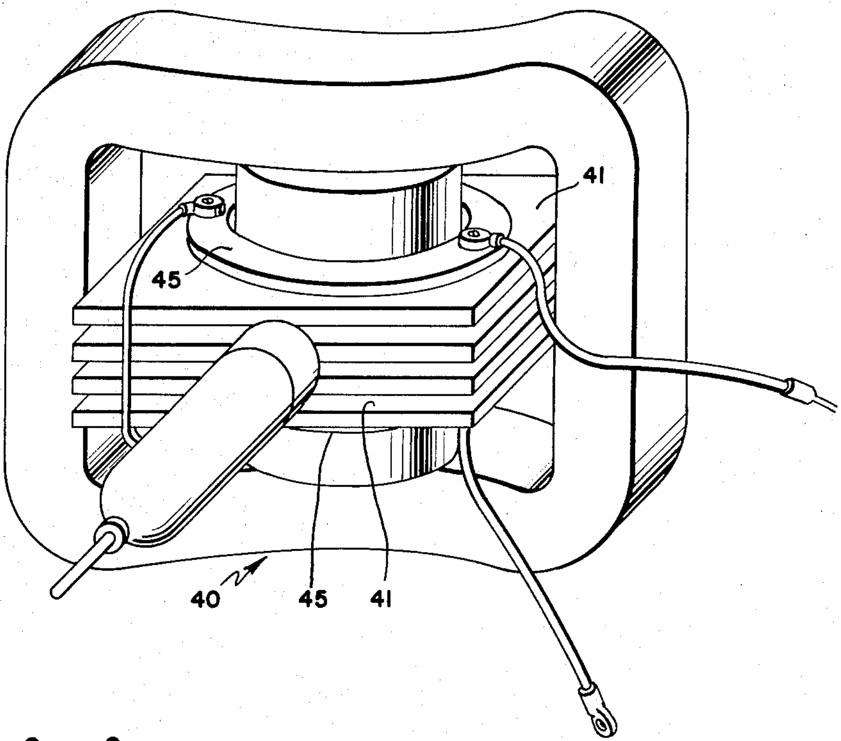
Figure 3:
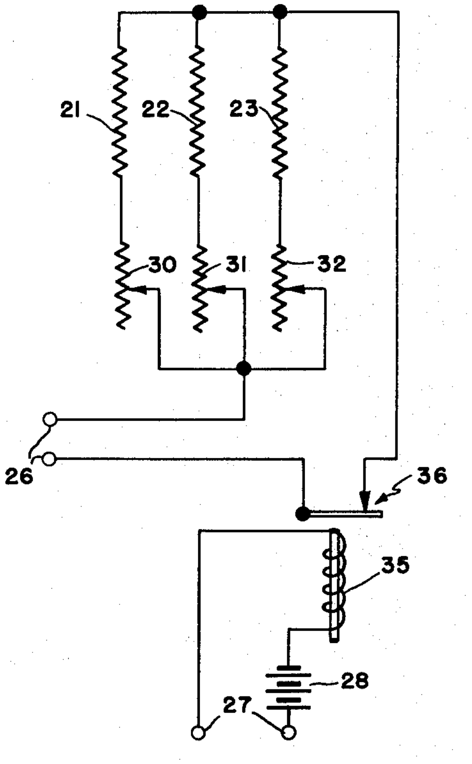

Further objects and advantages of the present invention will be made apparent by reference to the following description and to the appended drawing, in which:

Fig. 1 illustrates the present invention as applied to a concentric line oscillator employing a megatron tube, Fig. 2 is an illustration of the present invention applied to a magnetron oscillator, and Fig. 3 is a circuit diagram of the heating elements of the present invention.

Referring now to Fig. 1 of the drawing, the megatron 11 is provided with an anode cap 12, a grid ring 13, and a cathode ring 14, through which the high frequency connections to the tubes are made, and the resonant circuits consist of concentric tubes connected to appropriate tube elements. The oscillator circuit illustrated is a modified Barkhausen-Kurz circuit, and since the circuit itself forms no part of the present invention, further description of its operation is unnecessary.

The anode cap 12, the grid ring 13, and the cathode ring 14 are composed of highly conductive material and therefore readily transmit both heat and electricity. The anode line 16 and the grid line 17 are also of highly conductive material, and, because highly conductive materials usually have a high coefficient of temperature expansion, are quite sensitive to temperature changes. While the radio frequency currents in these lines will cause slight heating, the major portion of the heating is produced by the high current densities in the elements of the tube itself transmitted throughout the lines by the highly conductive materials employed in their construction. During operation of the tube 11 the grid ring 13 becomes quite hot and so heats the line 17 considerably while the anode cap 12 remains relatively cool in the circuit shown. The cathode ring 14 is heated by the filament of the tube and is also at an elevated temperature.

When the tube 11 is operating, the electrodes and the resonant lines are maintained at a substantially constant temperature, but when the tube is cut off, the lines and the elements cool quickly so as to change the resonant frequency of the circuit. To provide an auxiliary source of heat for the tube elements, a resistance heating element is secured in a position adjacent each element. The anode resistance element 21 is mounted within the anode line 16 adjacent the anode cap 12, while the cathode resistance element 23 is mounted around the cathode ring 14. The grid heating element 22 is clamped against the grid ring 13 between the grid line 17 and the mounting base 18 by means of the insulated screw collar 19, and should be insulated from the mounting base 18 to prevent a short circuit therethrough.

The resistance elements 21, 22, and 23 are proportioned to produce heat in a volume substantially equal to the heat produced by normal operation in the associated electrode. In order to provide adjustment for the individual resistance elements, a series resistance element may be included in each heater circuit. It will be readily apparent to those skilled in the art that thermostats mounted on the metal parts may also be included to provide automatic control of the temperature, if desired.

Referring now to Fig. 3, the terminals 26 are adapted to be connected to a source of power such as a conventional power circuit or the battery of an airplane or a land vehicle. The resistance elements 21, 22, and 23 are each connected in series with individualized variable resistances 30, 31, and 32 respectively, and the series circuits thus formed are connected in parallel with each other. A relay 35 having normally closed contacts 36 is provided with a source of power 28 and is adapted to be operated by a transmitting key, a send-receive change-over switch, or the microphone switch on the transmitter. Its contacts 36 are connected in series with the resistance elements 21, 22, and 23 so that the heaters are disconnected when the oscillator is energized.

Fig. 2 illustrates the application of the present invention to a magnetron tube 40 having an anode block 41 of highly conducting material. A pair of heating elements 45 are attached to the top and bottom of the anode block 41 and are serially connected to provide uniform heating thereof. As is well-known to those skilled in the art, the frequency at which a magnetron tube oscillates is determined by the configuration and dimensions of its anode block and temperature changes cause dimensional changes in the block 41 which vary the frequency of its output. By means of the present invention, the block is maintained substantially constant. The electrical circuit of the heaters 45 is similar to that shown in Fig. 3.

It will be obvious to those skilled in the art that many changes may be made in the device herein described. The design of the heating elements will depend upon the capacity and type of the tube with which it is employed and upon the source of heater power available. The invention is applicable to any type of tube in which internal heating is transmitted to the exterior of the tube through a conductive path such as metallic elements passing through the envelope.

The device herein described may be manufactured and used by or for the government of the United States of America for governmental purposes without the payment of any royalties therefor or thereon.

1. In a high frequency circuit employing a megatron tube on an intermittent duty cycle, means for stabilizing the frequency thereof comprising, a first electrical resistance element exterior of said tube and in mechanical contact with the anode terminal thereof, a second electrical resistance element exterior of said tube and in mechanical contact with the grid ring of said tube, a first variable resistance connected to one end of said first electrical resistance element, a second variable resistance connected to one end of said second resistance element, a relay having normally closed contacts, first electrical circuit means adapted to connect the other ends of said first and second electrical resistance elements together and to a source of electric power and said first and second variable resistances to said source of power, said relay having normally closed contacts, said contacts serially connected between said resistance elements and the source of power, and second electrical circuit means for energizing said relay when said tube is energized, whereby said first and second electrical resistance elements are connected to said source of power when said tube is de-energized to maintain said tube elements at a substantially constant temperature.

2. A high frequency oscillator circuit operating on an intermittent duty cycle including a megatron tube having an anode, a grid ring and a cathode, means for stabilizing the frequency of said circuit comprising, a first electrical resistance element positioned adjacent said anode, a second electrical resistance element positioned adjacent said grid ring, a third electrical resistance element positioned adjacent said cathode, and means for energizing said resistance elements when said tube is deenergized, whereby said tube elements and line elements connected thereto are maintained at a substantially constant temperature.

3. A high frequency oscillator circuit operating on an intermittent duty cycle including a megatron tube having an anode element, a grid ring element and a cathode element, means for stabilizing the frequency of said circuit by preventing physical change in said elements due to temperature changes comprising, heater means positioned adjacent to each of said tube elements and adapted to maintain said tube elements and line elements connected thereto at a substantially constant temperature, variable means connected to said heater means and adapted to control the output of the heater means, and means including a relay for intermittently operating said heater means in accordance with the operation of said tube, whereby the heater means are energized each time the megatron tube is deenergized.

References Cited in the file of this patent

UNITED STATES PATENTS

| | | |
|---|---|---|
| 1,894,687 | Hyland | Jan. 11, 1933 |
| 2,097,146 | De Lange | Oct. 26, 1937 |
| 2,523,031 | Lafferty | Sept. 19, 1950 |
| 2,595,662 | Houghton | May 6, 1952 |

FOREIGN PATENTS

| | | |
|---|---|---|
| 629,628 | Great Britain | Sept. 23, 1949 |